United States Patent
Isert et al.

(10) Patent No.: US 11,455,180 B2
(45) Date of Patent: Sep. 27, 2022

(54) EXTENSIBLE COMPUTING ARCHITECTURE FOR VEHICLES

(71) Applicant: Google LLC, Mountain View, CA (US)

(72) Inventors: Carsten Isert, Munich (DE); Eugene Koh, Kirkland, WA (US); Bernd Holzhey, Neubiberg (DE); Lenka Rímská, Munich (DE)

(73) Assignee: Google LLC, Mountain View, CA (US)

( * ) Notice: Subject to any disclaimer, the term of this patent is extended or adjusted under 35 U.S.C. 154(b) by 81 days.

(21) Appl. No.: 17/065,932

(22) Filed: Oct. 8, 2020

(65) Prior Publication Data

US 2021/0109770 A1 Apr. 15, 2021

Related U.S. Application Data

(60) Provisional application No. 62/914,153, filed on Oct. 11, 2019.

(51) Int. Cl.
| | |
|---|---|
| *G06F 9/455* | (2018.01) |
| *B60W 50/14* | (2020.01) |
| *G06F 3/0481* | (2022.01) |
| *G06F 9/54* | (2006.01) |
| *G06F 13/38* | (2006.01) |

(52) U.S. Cl.
CPC ......... *G06F 9/45508* (2013.01); *B60W 50/14* (2013.01); *G06F 3/0481* (2013.01);
(Continued)

(58) Field of Classification Search
CPC .... G06F 9/45508; G06F 3/0481; G06F 9/545; G06F 13/385; G06F 2213/0042; B60W 50/14
(Continued)

(56) References Cited

U.S. PATENT DOCUMENTS

| | | |
|---|---|---|
| 8,831,585 B2 | 9/2014 | Nicholson et al. |
| 9,544,414 B2 | 1/2017 | Kim et al. |

(Continued)

FOREIGN PATENT DOCUMENTS

| | | |
|---|---|---|
| JP | 2010237788 A | 10/2010 |
| JP | 2019057162 A | 4/2019 |

(Continued)

OTHER PUBLICATIONS

Response to Extended Search Report dated Feb. 24, 2021, from counterpart European Application No. 20200883.5, filed Oct. 4, 2021, 22 pp.

(Continued)

*Primary Examiner* — Hope C Sheffield
(74) *Attorney, Agent, or Firm* — Shumaker & Sieffert, P.A.

(57) ABSTRACT

A main computing device integrated into a vehicle may perform various aspects of the techniques described in this disclosure. The main computing device comprises a memory and a processor. The memory may store a first and second instance of a runtime environment. The processor may execute a first container that enables execution of a first instance of the runtime environment, and execute a second container that enables execution of a second instance of the runtime environment. The first instance of the runtime environment may detect a supporting computing device, transfer, responsive to detecting the supporting computing device, the second container to the supporting computing device, and interface with the second instance of the runtime environment to jointly present the user interface by which the operator of the vehicle controls the functionality of the vehicle.

20 Claims, 4 Drawing Sheets

(52) U.S. Cl.
CPC ............ *G06F 9/545* (2013.01); *G06F 13/385* (2013.01); *B60W 2050/146* (2013.01); *G06F 2213/0042* (2013.01)

(58) Field of Classification Search
USPC .......................................................... 715/708
See application file for complete search history.

(56) References Cited

U.S. PATENT DOCUMENTS

| | | | |
|---|---|---|---|
| 10,296,269 | B1 | 5/2019 | Bermundo et al. |
| 10,375,174 | B2 | 8/2019 | Haidar et al. |
| 2010/0251255 | A1 | 9/2010 | Miyamoto et al. |
| 2016/0239321 | A1* | 8/2016 | Dong .................. G06F 9/45558 |
| 2017/0206073 | A1* | 7/2017 | Kirkpatrick ............... G06F 8/61 |
| 2020/0210222 | A1 | 7/2020 | Kumabe |
| 2020/0310770 | A1* | 10/2020 | Buehler .................. G06F 9/445 |

FOREIGN PATENT DOCUMENTS

| | | | |
|---|---|---|---|
| JP | 2019135641 | A | 8/2019 |
| KR | 1020160051399 | | 5/2016 |
| WO | 2016/084049 | A1 | 6/2016 |

OTHER PUBLICATIONS

Extended Search Report from counterpart European Application No. 20200883.5, dated Feb. 24, 2021, 10 pp.
Gordon et al., "COMET: Code Offload by Migrating Execution Transparently," UENIX Association, 10th USENIX Symposium on Operating Systems Design and Implementation (OSDI '12), Jan. 8, 2014, pp. 93-106.
Examination Report from counterpart Indian Application No. 202044044016 dated Feb. 23, 2022, 6 pp.
Notice of Intent to Grant, and Translation thereof, from counterpart Japanese Application No. 2020-171313 dated Feb. 22, 2022, 5 pp.
Office Action, and Translation thereof, from counterpart Korean Application No. 10-2020-0130322 dated Feb. 25, 2022, 11 pp.
Response to Extended Search Report dated Feb. 23, 2022, from counterpart Indian Application No. 202044044016 filed Apr. 14, 2022, 59 pp.
Response to Office Action, and Translation thereof, dated Feb. 25, 2022, from counterpart Korean Application No. 10-2020-0130322 filed Apr. 21, 2022, 32 pp.

* cited by examiner

EXTENSIBLE COMPUTING ARCHITECTURE FOR VEHICLES

This application claims the benefit of U.S. Provisional Application No. 62/914,153, entitled "EXTENSIBLE COMPUTING ARCHITECTURE FOR VEHICLES," filed Oct. 11, 2019, the entire contents of which are hereby incorporated by reference as if set forth in their entirety.

BACKGROUND

Reliability of vehicles is increasing to the point that the average life cycle of vehicles is at or nearing ten plus years of service. As vehicles age during the years of service, computing systems, including head units, electronic control units (ECUs), and the like, may increasingly become outdated, entering end of life in terms of technical support, maintenance (and other support), and support of new features. Moreover, head units and other computing systems are increasingly being seamlessly integrated into dashboards and other components of the vehicles such that replacement of the head units is becoming difficult due to unique form factors, inclusion of large and possibly expensive displays, etc.

Although upgrade of the head unit is possible, such upgrades to replace the head unit (and other computing systems) is often expensive, as the cost of replacing an entire head unit may require replacement of the screen and other (relatively) expensive components, which, while not necessary, is required (as the head unit often integrates the display and other expensive components into a single housing or replaceable unit) and difficult (as such head units are seamlessly integrated into each vehicle and specific to each make and model of the vehicle, potentially limiting availability of replacement head units and further possibly driving up the cost). As such, operators of vehicles may purchase an entirely new vehicle in an effort to gain access to newer technology, such as computing systems, including head units and other infotainment and other components, at considerable expense.

SUMMARY

In general, various aspects of the techniques set forth in this disclosure are directed to an extensible computing architecture for vehicles. Rather than replace the head unit or other computing systems of a vehicle, the techniques may enable a head unit or other computing system to interface with a supporting computing system that is communicatively coupled to the head unit, where the head unit or other computing device may offload or otherwise transfer execution of applications (and other runtime environment level operations, not just execution of the application space) to the supporting computing device.

The head unit or other computing device may detect communicatively coupling of the supporting device and, responsive to detecting the communicative coupling of the supporting computing device, transfer a container that includes a partition of the runtime environment to the supporting computing device. The supporting computing device may then execute the partition of the runtime environment in order to synchronize operation of the runtime environment and thereby provide a user space in which the applications may execute (while also supporting execution of the kernel space, or in other words, the runtime environment space, as a distributed runtime environment). The supporting computing device may be replaceable or otherwise upgradeable to allow extensible execution of the runtime environment by the head unit, where the supporting computing device may be upgraded to facilitate adaption of new features, support (in terms of, as an example, end of life services, such as technology support—including software patching and the like to address security and other concerns), and maintenance (in terms of, for example, hardware upgrades—such as processing capabilities, memory size, etc.).

Addition of the supporting computing device may allow for upgrades to the main computing unit (which is another way to refer to the "head unit" or other computing device) that is less expensive (as the supporting computing device is not seamlessly integrated into the vehicle, but only communicatively coupled to the head unit, thereby relieving expenses associated with the seamless integration, such as form factor, additional components such as displays, global positioning systems (GPS), etc.). In addition, support of the addition of the supporting computing device may enable upgrades to the main computing device without having to separately replace the main computing device, thereby allowing for upgrade of the main computing device without having to replace the main computing device.

In this respect, various aspects of the techniques may provide a container software architecture (where the term contain may generally refer to a general software block or construct) to ensure synchronization between the main computing device and the supporting computing device in such a manner to potentially provide a consistent user experience even though the main computing device and the supporting computing device may execute different versions of the runtime environment. As such, the techniques may improve operation of the main computing device itself (as facilitating upgrade by way of the supporting computing device may extend the life of the head unit itself and reduce upgrade costs), while potentially maintaining a consistent user experience throughout upgrades to the supporting computing device.

In an example, aspects of the techniques are directed to a method comprising: executing, by a main computing device integrated into a vehicle, a first container that enables execution of a first instance of a runtime environment; executing, by the main computing device, a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; transfer, responsive to detecting the supporting computing device, the second container to the supporting computing device; and interface with the second instance of the runtime environment executed by the supporting computing device to jointly present the user interface by which the operator of the vehicle controls the functionality of the vehicle.

In another example, aspects of the techniques are directed to a main computing device integrated into a vehicle, the main computing device comprising: a memory configured to store a first instance of a runtime environment and a second instance of the runtime environment; one or more processors configured to: execute a first container that enables execution of a first instance of the runtime environment: execute a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; transfer, responsive to detecting the supporting computing device, the second container to the supporting computing device; and interface with the second instance of the runtime environment executed by the supporting computing device to jointly present the user interface by which the operator of the vehicle controls the functionality of the vehicle.

In another example, aspects of the techniques are directed to a non-transitory computer-readable storage medium having stored thereon instructions that, when executed, cause one or more processors of a main computing device to: execute a first container that enables execution of a first instance of a runtime environment; execute a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; transfer, responsive to detecting the supporting computing device, the second container to the supporting computing device; and interface with the second instance of the runtime environment executed by the supporting computing device to jointly present the user interface by which the operator of the vehicle controls the functionality of the vehicle.

In another example, aspects of the techniques are directed to a method comprising: receiving, from a main computing device integrated into a vehicle that supports execution of a first container in which a first instance of a runtime environment executes, and by a supporting computing device, a second container that supports execution of a second instance of the runtime environment, the first instance of the runtime environment and the second instance of the runtime environment configured to jointly present a user interface by which an operator of the vehicle controls functionality of the vehicle, and executing, by the supporting computing device, the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle.

In another example, aspects of the techniques are directed to a supporting computing device comprising: one or more processors configured to: receive, from a main computing device integrated into a vehicle that supports execution of a first container in which a first instance of a runtime environment executes, a second container that supports execution of a second instance of the runtime environment, the first instance of the runtime environment and the second instance of the runtime environment configured to jointly present a user interface by which an operator of the vehicle controls functionality of the vehicle, and execute the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle; and a memory configured to store the second container.

In another example, aspects of the techniques are directed to a non-transitory computer-readable storage medium having stored thereon instructions that, when executed, cause one or more processors of a supporting computing device to: receive, from a main computing device integrated into a vehicle that supports execution of a first container in which a first instance of a runtime environment executes, a second container that supports execution of a second instance of the runtime environment, the first instance of the runtime environment and the second instance of the runtime environment configured to jointly present a user interface by which an operator of the vehicle controls functionality of the vehicle, and execute the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle; and a memory configured to store the second container.

In another example, aspects of the techniques are directed to a computing system comprising: a main computing device configured to: execute a first container that enables execution of a first instance of a runtime environment; execute a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; and transfer, responsive to detecting the supporting computing device, the second container to the supporting computing device; and a supporting computing device configured to: receive, from the main computing device, the second container that supports execution of the second instance of the runtime environment; and execute the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle.

The details of one or more examples are set forth in the accompanying drawings and the description below, Other features, objects, and advantages of the disclosure will be apparent from the description and drawings, and from the claims.

DETAILED DESCRIPTION

Figure 1:
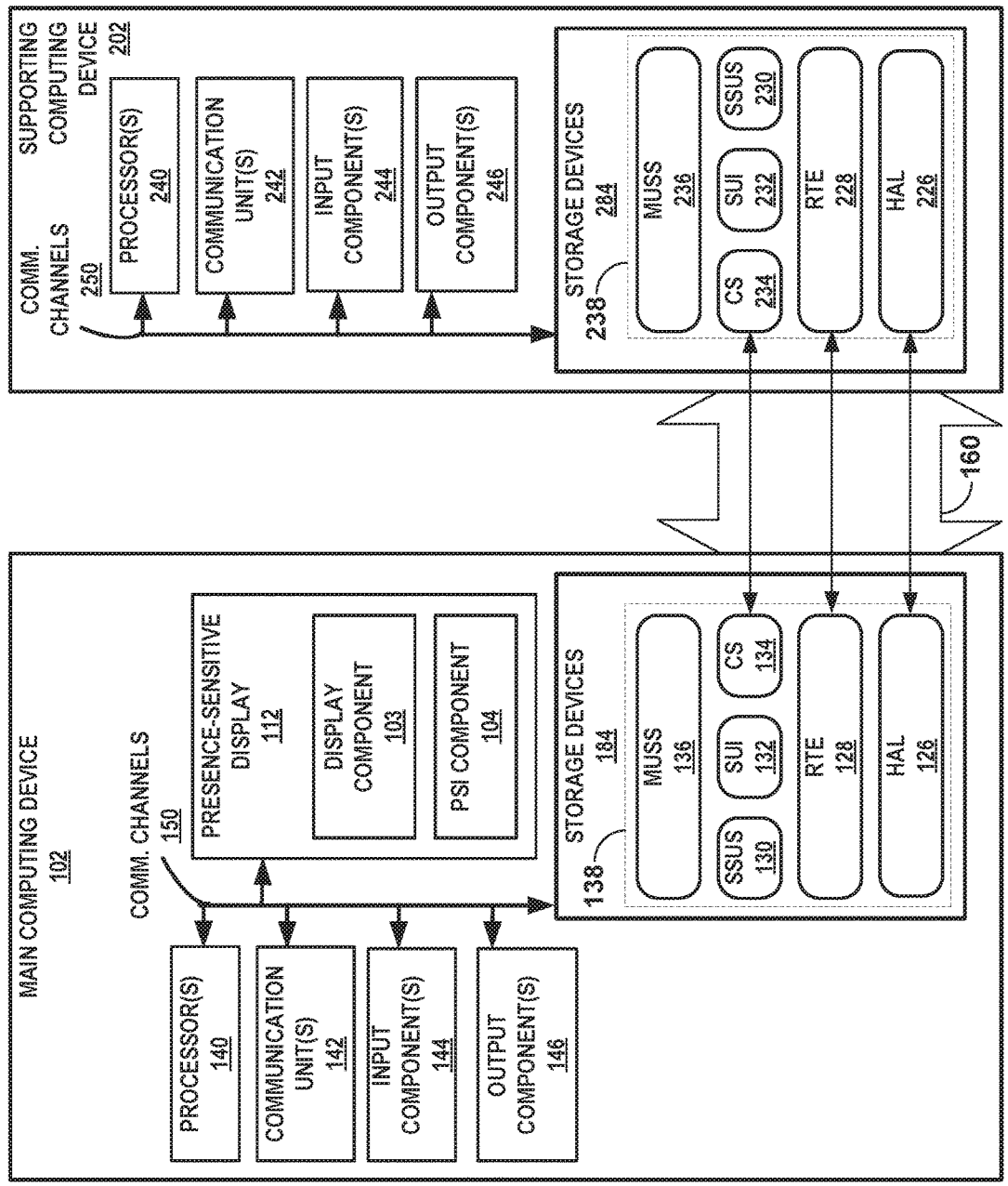
FIG. 1 is a block diagram illustrating an example computing system that is configured to provide an extensible computing architecture for vehicles in accordance with various aspects of the techniques described in this disclosure.

FIG. 1 is a block diagram illustrating an example computing system that is configured to provide an extensible computing architecture for vehicles in accordance with various aspects of the techniques described in this disclosure. As shown in the example of FIG. 1, a computing system 100 includes a main computing device 102 and a supporting computing device 202. Although described with respect to a vehicle, the computing system 100 may be utilized in different contexts, including standalone computing systems (including laptop computers, desktop computers, workstations and the like), gaming systems, cellular telephones (including so-called "smartphones"), media systems (including streaming media systems), audio/visual (A/V) receivers, televisions (including so-called "smart televisions"), smart speakers, smart watches, thermostats (including so-called "smart thermostats"), smart glasses, or any other computing system.

In any event, main computing device 102 is an example of vehicle computing device, such as head unit or other vehicular computing system (such as an electronic control unit ECU). FIG. 1 illustrates only one particular example of main computing device 102, and many other examples of main computing device 102 may be used in other instances and may include a subset of the components included in example computing device 102 or may include additional components not shown in FIG. 1.

As shown in the example of FIG. 1, main computing device 102 includes presence-sensitive display 112, one or more processors 140, one or more communication units 142, one or more input components 144, one or more output components 146, and one or more storage devices 148. Storage devices 148 of main computing device 102 include a software hierarchy formed, in part, by a hardware abstraction layer 126 ("HAL 126"), an runtime environment 128 ("RTE 128"), a system and single user services (SSUS) module 130 ("SSUS 130"), a system user interface (SUS) module 132 ("SUS 132"), a car services (CS) module 134 ("CS 134"), and a multi-user service space (MUSS) module 136 ("MUSS 136").

Communication channels 150 may interconnect each of the components 112, 140, 142, 146, and/or 148 for inter-component communications (physically, communicatively, and/or operatively) and thereby allow components 112, 140, 142, 146, and 148 to communicate with one another. In some examples, communication channels 150 may include a system bus, a network connection, one or more inter-process communication data structures, or any other components for communicating data (also referred to as information). Although shown as including components 112, 140, 142, 146, and 148, main computing device 102 may include other components or less components than those shown, where such components may be included in other control units such as a telematic control unit (TCU).

One or more communication units 142 of computing device 100 may communicate with external devices by transmitting and/or receiving data. For example, main computing device 102 may use one or more communication units 142 to transmit and/or receive radio signals on a radio network such as a cellular radio network. In some examples, communication units 142 may transmit and/or receive satellite signals on a satellite network such as a Global Positioning System (GPS) network. Examples of communication units 142 include a network interface card (e.g. such as an Ethernet card), an optical transceiver, a radio frequency transceiver, a GPS receiver, or any other type of device that can send and/or receive information. Other examples of communication units 142 may include short wave radios (e.g., NFC, BLUETOOTH (including BLE)), GPS, 3G, 4G, 5G, and WIFI radios found in mobile devices as well as Universal Serial Bus (USB) controllers and the like.

One or more input components 144 of main computing device 102 may receive input. Examples of input are tactile, audio, kinetic, and optical input, to name only a few examples. Input components 144 of main computing device 102 include, in one example, a mouse, keyboard, touchpad, voice responsive system, video camera, buttons, scroll wheel, dial, control pad, microphone or any other type of device for detecting input from a human or machine. Input components 144 may include cameras. In some examples, input component 144 may be a presence-sensitive input component, which may include a presence-sensitive screen, touch-sensitive screen, etc. separate from presence-sensitive display 112.

One or more output components 146 of main computing device 102 may generate output. Examples of output are tactile, audio, and video output. Output components 146 of computing device 100, in some examples, include a presence-sensitive screen (possibly separate from presence-sensitive display 112), sound card, video graphics adapter card, speaker, cathode ray tube (CRT) monitor, liquid crystal display (LCD), organic light emitting diode (OLED), or any other type of device for generating tactile, audio and/or visual output to a human or machine.

In some examples, presence-sensitive display 112 of main computing device 102 may include functionality of input component 144 and/or output components 146. In the example of FIG. 1, presence-sensitive display 112 may include a presence-sensitive input (PSI) component 104 ("PSI component 104"), such as a presence-sensitive screen or touch-sensitive screen. In some examples, presence-sensitive input component 104 may detect an object at and/or near the presence-sensitive input component. As one example range, presence-sensitive input component 504 may detect an object, such as a finger or stylus that is within two inches or less of presence-sensitive input component 104. Presence-sensitive input component 104 may determine a location (e.g., an (x,y) coordinate) of the presence-sensitive input component at which the object was detected. In another example range, presence-sensitive input component 104 may detect an object two inches or less from presence-sensitive input component 104 and other ranges are also possible. Presence-sensitive input component 104 may determine the location of presence-sensitive input component 104 selected by a user's finger using capacitive, inductive, and/or optical recognition techniques.

In some examples, presence-sensitive display 112 may also provide output to a user using tactile, audio, or video stimuli as described with respect to output component 146. For instance, presence-sensitive display 112 may include display component 103 that displays a graphical user interface. Display component 103 may be any type of output component that provides visual output, such as described with respect to output components 146. While illustrated as an integrated component of main computing device 102, presence-sensitive display 112 may, in some examples, be an external component that shares a data or information path with other components of main computing device 102 for transmitting and/or receiving input and output. For instance, presence-sensitive display 512 may be a built-in component of main computing device 102 located within and physically connected to the external packaging of main computing device 102 (e.g., an in-vehicle screen mounted in a dashboard of a vehicle). In another example, presence-sensitive display 112 may be an external component of main computing device 102 located outside and physically separated from the packaging of main computing device 102 (e.g., a monitor, a projector, etc, that shares a wired and/or wireless data path with a electronic control unit of the vehicle). In some examples, presence-sensitive display 112, when located outside of and physically separated from the packaging of main computing device 102, may be implemented by two separate components: a presence-sensitive input component 104 for receiving input and a display component 103 for providing output.

One or more storage components 148 within main computing device 102 may store information for processing during operation of main computing device 102 (e.g., computing device 102 may store data accessed by modules 126-136 during execution at main computing device 102). In some examples, storage component 148 is a temporary memory, meaning that a primary purpose of storage component 148 is not long-term storage. Storage components 148 on main computing device 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 148, in some examples, also include one or more computer-readable storage media. Storage components 148 in some examples include one or more non-transitory computer-readable storage mediums. Storage components 148 may be configured to store larger amounts of information than typically stored by volatile memory. Storage components 148 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage components 148 may store program instructions and/or information (e.g., data) associated with modules 126-136. Storage components 148 may include a memory configured to store data or other information associated with modules 126-136.

One or more processors 140 may implement functionality and/or execute instructions associated with main computing device 102. Examples of processors 140 include application processors, display controllers, auxiliary processors, one or more sensor hubs, and any other hardware configure to function as a processor, a processing unit, or a processing device. Modules 126-136 may be operable (or, in other words, executed) by processors 140 to perform various actions, operations, or functions of main computing device 102. That is, modules 126-136 may form executable bytecode, which when executed, cause processors 140 to perform specific operations (and thereby causing main computing device 102 to become a specific-purpose computer by which to perform) in accordance with various aspects of the techniques described herein. For example, processors 140 of main computing device 102 may retrieve and execute instructions stored by storage components 148 that cause processors 140 to perform the operations described herein that are attributed to modules 126-136. The instructions, when executed by processors 140, may cause main computing device 102 to store information within storage components 148.

Supporting computing device 202 may include components similar to main computing device 102. As further shown in the example of FIG. 1, supporting computing device 202 may include one or more processors 240, one or more communication units 242, one or more input components 244, one or more output components 246, and one or more storage devices 284. Each of components 240-284 may be similar to, if not substantially similar to, respective components 140-184, as discuss in more detail above, except that supporting computing device 202 may not include a presence-sensitive display similar to presence-sensitive display 112 or any other visual, auditory, or other output device or interface.

Supporting computing device 202 also includes communication bus 250 interconnecting modules 240-284. Communication bus 250 may be similar to, if not substantially similar to, communication bus 150 discussed in more detail above.

Furthermore, storage devices 284 may store modules 226-236, which may be similar to, if not substantially similar to, respective modules 126-136. That is, storage devices 284 may store a HAL 226, OS 228, SSUS 230, SUI 232, CS 234, and MUSS 236, which each function as indicated above to offload operation of or act in coordination with respective modules 126-136 to execute various aspects of the techniques described in more detail below.

As described above, computing system 100 may be integrated or otherwise included within a vehicle. The vehicle may include one or more of a bicycle, a tricycle, a unicycle, an automobile, farm equipment (such as a tractor, combine, etc.), construction equipment (a dump truck, crane, etc.), military vehicle or equipment (a tank, armament, etc.), a truck, a semi-tractor (or, in other words, a semi-trailer), aviation equipment (such as a plane), nautical equipment (such as a boat, carrier, etc.), or any other type of vehicle.

Reliability of vehicles is increasing to the point that the average life cycle of vehicles is at or nearing ten plus years of service. As vehicles age during the years of service, computing systems, such as computing system 10, including head units, electronic control units (ECUs), and the like, may increasingly become outdated, entering end of life in terms of technical support, maintenance (and other support), and support of new features. Moreover, head units and other computing systems, including main computing device 102, are increasingly being seamlessly integrated into dashboards and other components of the vehicles such that replacement of the head units (where main computing device 102 is one example) is becoming difficult due to unique form factors, inclusion of large and possibly expensive displays, etc.

Although upgrade of the head unit is possible, such upgrades to replace the head unit (and other computing systems) is often expensive (as the cost of replacing an entire head unit may require replacement of the display and other (relatively) expensive components, which, while not necessary, is required (as the head unit often integrates the display and other expensive components into a single housing or replaceable unit) and difficult (as such head units are seamlessly integrated into each vehicle and specific to each make and model of the vehicle, potentially limiting availability of replacement head units and further possibly driving up the cost). As such, operators of vehicles may purchase an entirely new vehicle in an effort to gain access to newer technology, such as computing systems, including head units and other infotainment and other components, at considerable expense.

The migration path for acquiring updated computing systems may result in considerable expense (both in initial outlays of money to purchase a new or newer vehicle and in terms of upgrade costs for replacing head units) to operators that would like to access newer technology (e.g., a new head unit that offers extended functionality in terms of features provided by upgraded OS, applications, etc.). The expense of migration to newer technology may present a barrier to adoption of the newer technology, slowing uptake by operators of various features, that may include safety features, security features, data privacy features, and the like.

In accordance with various aspects of the techniques described in this disclosure, computing system 100 may implement an extensible computing architecture for vehicles. Rather than replace main computing unit 102 (which may represent one example of a so-called "head unit" and as such be referred to as "head unit 102") or other computing systems of a vehicle, the techniques may enable head unit 102 or other computing system to interface with supporting computing system 202 that is communicatively coupled to head unit 102, where head unit 102 or other computing device may offload or otherwise transfer execution of applications (and other runtime environment level operations, not just execution of the application space) to supporting computing device 202.

Head unit 102 or other computing device may detect communicatively coupling of supporting device 202 and, responsive to detecting the communicative coupling of supporting computing device 202, transfer a container 238 that includes a partition of runtime environment 228 to supporting computing device 202. Although described as transferring container 238 to supporting computing device 202, head unit 102 may merely transfer an indication that supporting computing device 202 has been detected and should begin execution of a pre-installed container (similar to container 238) in order to execute a pre-installed partition of the OS, which may be similar if not substantially similar to runtime environment 228. As such, transfer of the container 238 should be understood to refer to transfer of the actual container itself or transfer of execution of a pre-installed container from head unit 102 to supporting computing device 202.

In any event, supporting computing device 202 may then execute the partition of RTE 228 in order to synchronize operation of RTES 128 and 228 and thereby provide a user space in which the applications may execute (while also supporting execution of the kernel space, or in other words, the runtime environment space, as a distributed runtime environment). Supporting computing device 202 may be replaceable or otherwise upgradeable to allow extensible execution of RTEs 128 and 228 by head unit 102, where supporting computing device 202 may be upgraded to facilitate adaption of new features, support (in terms of, as an example, end of life services, such as technology support—including software patching and the like to address security and other concerns), and maintenance (in terms of, for example, hardware upgrades—such as processing capabilities, memory size, etc.

Addition of supporting computing device 202 may allow for upgrades to main computing unit 102 (which is, again, another way to refer to the "head unit" or other computing device) that is less expensive (as supporting computing device 202 is not seamlessly integrated into the vehicle, but only communicatively coupled to head unit 102, thereby relieving expenses associated with the seamless integration, such as form factor, additional components—such as displays, global positioning systems (GPS), etc.). In addition, support of the addition of supporting computing device 202 may enable upgrades to main computing device 102 without having to separately replace main computing device 102, thereby allowing for upgrade of main computing device 102 without having to replace main computing device 102.

In this respect, various aspects of the techniques may provide a container software architecture to ensure synchronization between main computing device 102 and supporting computing device 202 in such a manner to potentially provide a consistent user experience even though main computing device 102 and the supporting computing device 202 may execute different versions of the runtime environment. As such, the techniques may improve operation of main computing device 102 itself (as facilitating upgrade by way of supporting computing device 202 may extend the life of head unit 102 itself, reducing upgrade costs and promoting improved functionality as offloading processing to supporting computing device 202 may result in improved processing, storage, and/bandwidth), while potentially maintaining a consistent user experience throughout upgrades to supporting computing device 202.

In operation, main computing device 102 may initially execute a first container 138 that enables execution of a first instance of an runtime environment (e.g., RTE 128). As described above, main computing device 102 may include the above noted software hierarchy. As such, HAL 126 may execute as a kernel software shim between a kernel of RTE 128 to provide seamless interaction between RTE 128 and underlying hardware of the vehicle (which is not shown for ease of illustration). Hardware components of the vehicle may include a GPS system, an automation system (such as self-driving systems and/or dynamic cruise control systems), heating, ventilation, and air condition (I-RAC) systems, window systems (for controlling operation of the windows), interior lighting systems (for controlling operation of various interior lights), exterior lighting systems (for controlling operation of various exterior lights), safety systems (including, for example, automatic breaking systems ABS, lane assist systems, attention-based safety systems, etc.), heated seating systems, cooled seating systems, or any other system present in vehicles.

As such, RTE 128 may execute within HAL 126, where HAL 128 may intercept commands or other output signals issued by RTE 128 and translate the RTE-specific commands to vehicle-specific commands supported by the underlying vehicle hardware while also translating vehicle-specific data into RTE-specific data supported by RTE 128. Translation of the OS-specific commands and the vehicle-specific data may occur transparently to RTE 128, allowing separate development of HAL 126 from RTE 128 and thereby facilitate adoption of a general RUE 128 with a shim (e.g., HAL 126) tailored for individual vehicles (which may vary across make and model in terms of original equipment manufacturer—OEM—hardware and/or components).

RTE 128 may execute in the above mentioned kernel space to provide an execution environment for system level applications and user applications. In the example of FIG. 1, SSUS 130, SUI 132, and CS 134 may each represent system level applications that execute within the execution environment provided by RTE 128. RTE 128 may grant each of SSUS 130, SUI 132, and CS 134 system level privileges that permit increased access to the underlying vehicle hardware, while RTE 128 grants user-specific privileges to applications executing within MUSS 136 that are more restrictive than the system level privileges granted to each of SSUS 130, SUI 132, and CS 134. The system level privileges may allow increased access (in terms of permissions to access or priority) to the vehicle hardware components compared to the user-specific privileges. As an example, SSUS 130, SUI 132, and CS 134 may access one or more of the hardware systems or components of the vehicle to control operation of the hardware systems or components while MUSS 136 may only access data provided by the hardware systems or components of the vehicle (such as GPS coordinates output by the GPS system, ambient temperature output by HVAC system, etc.).

SSUS 130 may represent a module configured to execute single-user services (e.g., services that are common across all users, and as such may also be referred to as "common services") and system services (e.g., first party applications that are installed across all users and present one or more system services for use by all users of main computing device 102). SIR 132 may represent a module configured to present a system-level user interface with which the operator of the vehicle may interact to control various operations of the vehicle as well as launch or otherwise initiate execution of applications (as represented by MUSS 136). CS 134 may represent a module configured to interface (e.g., an API) with various car services, including GPS systems, HVAC systems, seating systems, window systems, or any other the other systems listed more exhaustively elsewhere herein.

MUSS 136 may represent one or more modules that provide individual user profiles that include specific third party applications, user-specific automotive services (associated with an individual user), and other user-specific data or information. MUSS 136 may execute in the application space maintained by the underlying RTE 128. MUSS 136 may, in this respect, represent a module executing in application space to provide extended software capabilities by way of applications that can be downloaded and/or installed to extend the capabilities of main computing device 102.

Main computing device 102 may also initially execute (although not shown in FIG. 1 for ease of illustration) a second container 238 that enables execution of a second instance of runtime environment (e.g., RTE 228), where RTE 128 and RTE 228 may be configured to jointly present a user interface (e.g., as provided by SUI 132 and 232) by which an operator of the vehicle controls functionality of the vehicle. Main computing device 102 may execute container 138 as a primary or host container 138 and the container 238 as a secondary of client container 238, where client container 238 operates to support execution of host container 138. As such, client container 238 may operate on behalf of host container 138 and may not execute independent of host container 138. Although described as operating on behalf of host container 138, client container 238 may execute independent of host container 138, where host container 138 may, in this example, represent a shim for passing data to client container 238.

Main computing device 102 may execute (via, as noted above, processors 140) container 138, which may invoke execution of RTE 128 (and underlying HAL 126). RTE 128 may, via interactions with input components 144 and/or communication units 142, detect supporting computing device 202 in communication with main computing device 102. That is, supporting computing device 202, upon being connected to main computing device 102, may power on (when powered via the communication interface) and execute a lightweight operating system or (different than RTE 228) or other low-level software (such as firmware, etc.) by which to interface, via output components 248 and/or communication units 242, with main computing device 102. RTE 128 may then detect communicative coupling with supporting computing device 202, which may involve a protocol or other application programmer interface (API) call to establish communication between main computing device 102 and supporting computing device 202.

The connection between main computing device 102 and supporting computing device 202 is shown as connection 160 in the example of FIG. 1. Connection 160 may include a wireless connection, a wired connection (where connection is established via physical wire, such as a USB connection of any version—1.0, 2.0, 3.0, etc.), or a combination of wired (e.g., for power) and wireless connection.

Responsive to detecting supporting computing device 202, RTE 128 may transfer container 238 to supporting computing device 202. RTE 128 may transfer container 238 via output components 146 and/or communication units 142 to supporting computing device 202. Supporting computing device 202 may receive container 238, and execute the container 238 to establish a software hierarchy similar to that described above with respect to main computing device 102, thereby facilitating execution of HAL 226, RTE 228, SSUS 230, SUI 232, CS 234, and MUSS 236.

In effect, main computing device 102 may execute an overall RTE in segments or partitions, in which a first partition of the RTE (e.g., RTE 128) may execute in conjunction with a second partition of the RTE (e.g., RTE 228) to support the system and application space in which SSUS 130, 132, SUI 132, 232, CS 134, 234, and MUSS 136 and 236 execute. Main computing system 102 may execute containers 138 and 238 until detecting that supporting computing device 202 is communicatively coupled to main computing device 102.

Main computing device 102 may, prior to detecting communicative coupling with supporting computing device 202, execute both partitions (e.g., containers 138 and 238) of the overall RTE in a manner similar to, if not substantially similar to, that described below with respect to execution of a single container (e.g., container 138). In other words, when executing both of containers 138 and 238, main computing device 102 may continue to relay and synchronize data between containers 138 and 236, executing container 238 to support the application space in which MUSS 136 and 236 executes.

Transferring of container 238 to supporting computing device 202 may, in this way, offload execution of the container 238 to supporting computing device 202, which may allow main computing device 102 to reduce processing cycle, memory, and/or bandwidth consumption. As such, RTE 128 may operate as the host RTE relative to RTE 228, which operates as a client RTE. RTE 128 may redirect user input and other data to RTE 228, which may process the user input or other data and coordinate with RTE 128 to present any resulting outputs (e.g., via presence-sensitive display 112).

For example, HAL 226 may interface with HAL 126 to relay commands or other data from RTE 228, SSUS 230, and MUSS 236 that may control or otherwise update various settings associated with vehicle hardware components. Likewise, HAL 126 may relay command or other data from the vehicle hardware components to RTE 228, SSUS 230, and MUSS 236. In addition, RTE 128 and RTE 228 may exchange system settings, user settings, and other data or information to synchronize the various types of data in order to jointly execute a single instance of the RTE. In some examples, RTE 128 may have a particular version that is different than a version of the RTE 228, where RTE 128 may present a common API with which to interface with the RTE 228 that is the same or backwards compatible with the API used by RTE 228 to interface with the RTE 128 (despite having different executable code that is upgraded or more processor, memory, and/or bandwidth intensive than the executable code of the RTE 128). Furthermore, CS 234 and CS 134 may relay commands or other data between each other to synchronize support of car services between main computing device 102 and supporting computing device 202.

RTE 128 may, in this respect, interface with RTE 228 executed by supporting computing device 202 to jointly present the user interface by which the operator of the vehicle controls the functionality of the vehicle. RTE 128 may synchronize or otherwise maintain data structures that enable RTE 228 to obtain consistent state and other informational data with that maintained by RTE 128, both regarding the current operator (or, in other words, user of computing system 100) and the vehicle in which computing system 100 is integrated. As such, RTEs 128 and 228 may represent an instance of a distributed runtime environment capable of or otherwise configured to execute across one or more devices (e.g., main computing device 102 and/or supporting computing device 202) in order to jointly present the user interface by which to interact with the operator of the vehicle and the vehicle itself.

In this way, various aspects of the techniques may provide a container software architecture to ensure synchronization between main computing device 102 and supporting computing device 202 in such a manner to potentially provide a consistent user experience even though main computing device 102 and the supporting computing device 202 may execute different versions of the runtime environment (as described in more detail below). As such, the techniques may improve operation of main computing device 102 itself (as facilitating upgrade by way of supporting computing device 202 may extend the life of head unit 102 itself, reducing upgrade costs and promoting improved functionality as offloading processing to supporting computing device 202 may result in improved processing, storage, and/bandwidth), while potentially maintaining a consistent user experience throughout upgrades to supporting computing device 202.

Figure 2:
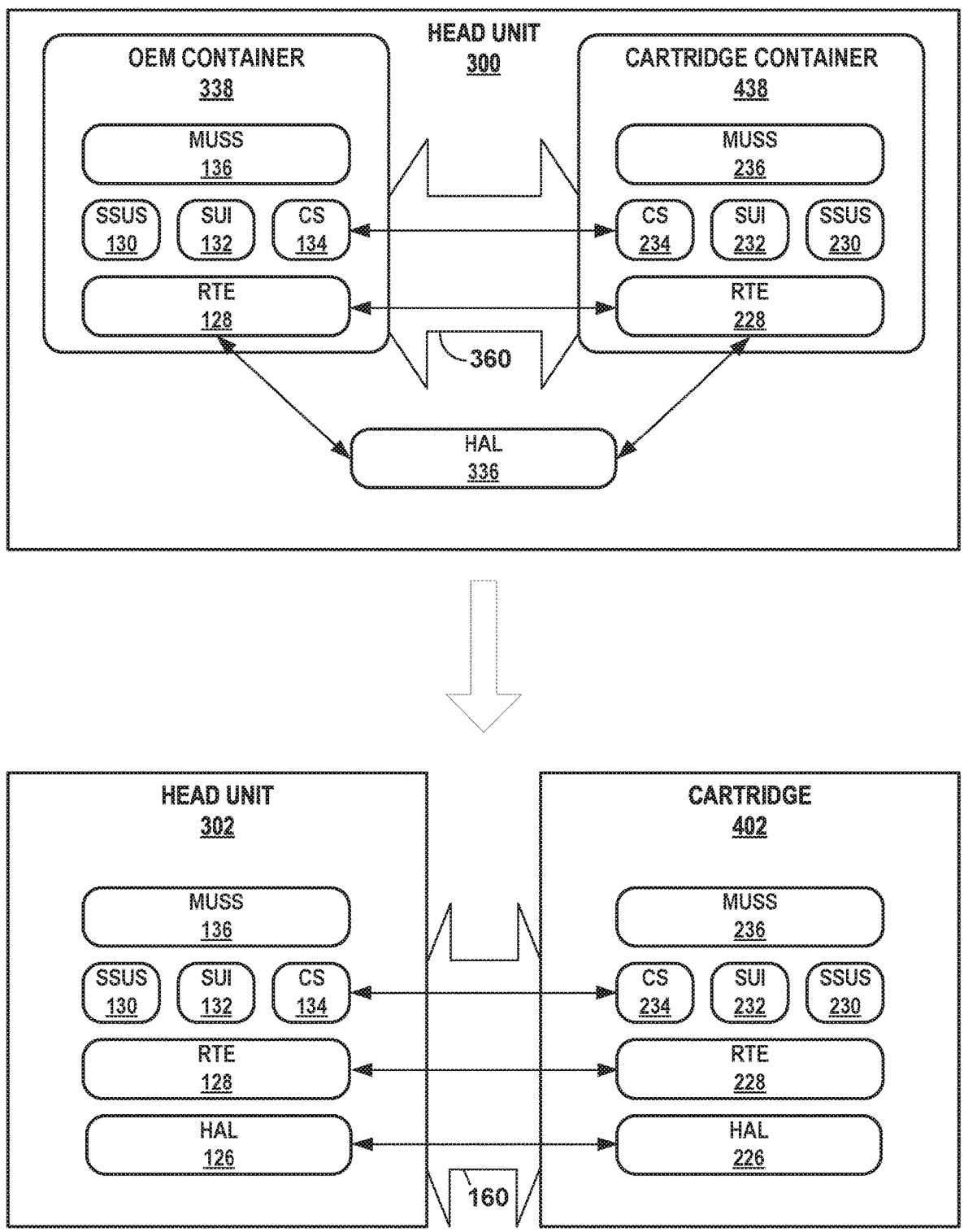
FIG. 2 is a block diagram illustrating example operation of a head unit in performing various aspects of the extensible hardware architecture techniques described in this disclosure.

FIG. 2 is a block diagram illustrating example operation of a head unit in performing various aspects of the extensible hardware architecture techniques described in this disclosure. As shown in the example of FIG. 2, a head unit 302 is configured to execute an OEM container 338 and a cartridge container 438. Head unit 302 may represent one example of main computing device 102 shown in the example of FIG. 1, while OEM container 338 may represent one example of container 138 shown in the example of FIG. 1 and cartridge container may represent one example of container 238 shown in the example of FIG. 1.

As such, OEM container 338 may include RTE 128, SSUS 130, SUI 132, CS 134, and MUSS 136, which may execute to provide the functionality described above. In addition, cartridge container 438 may include RTE 228, SSUS 230, SUI 232, CS 234, and MUSS 236, which may execute to provide the functionality described above. Head unit 300 may execute a single instance of HAL 336, which is similar to HAL 126 and HAL 226, except configured to support both of OEM container 338 and cartridge container 438.

Head unit 302 may execute both containers 338 and 438 as independent containers in which different partitions of the runtime environment (e.g., RTE 128 and RTE 238) execute to jointly present the user interface with which the operator interacts to control hardware components of the vehicle. Although HAL 336 may not synchronize data or other information (given that there is a single instance of HAL 336), RTE 128 and RTE 228 along with CS 134 and CS 234 may synchronize data (including state data, such as system settings and user settings) between one another. That is, RTE 128 may synchronize a user setting, a system setting, or some other setting between RTE 228 and RTE 128 to maintain a consistent user experience whether executing RTE 128 or RTE 228 alone (e.g., without executing the other RTE).

In addition, RTE 128 may redirect execution of an application to cartridge container 438, issuing a redirect command to the RTE 228. Responsive to the redirect command, RTE 228 may invoke the application, maintaining the application space in which the application executes, and execute the application.

As described above, RTE 128 may detect communicative coupling with cartridge 402. That is, RTE 128 may detect formation of communication channel 160 (which is another way to refer to "connection 160") between head unit 302 and cartridge 402, which previously was a virtual connection 360 internal to head unit 300. In other words, when synchronizing internally within head unit 302, RTE 128 may establish virtual connection 360 between OEM container 338 and cartridge container 438, where virtual connection 360 may appear to each of RTE 128 and RTE 228 as an external connection similar to connection 160.

Responsive to detecting the formation of connection 160, RTE 128 may initiate a number of different operations to transfer cartridge container 438 to cartridge 402. First, RTE 128 may replicate HAL 336 to obtain HAL 226, which RTE 128 may provide to cartridge 402. HAL 336 may then, after replication, reinitialize as HAL 126, which forms a first partition of a distributed HAL. RTE 128 may transfer HAL 226 to cartridge 402, where HAL 226 forms a second partition of the distributed HAL. Cartridge 402 may execute HAL 226 to communicate with HAL 126 and enable cartridge 402 to interface with the hardware components of the vehicle (e.g., possibly by transferring commands and other data to HAL 126, which relays the commands and other data to the hardware components of the vehicle).

RTE 128 may next initiate transfer of cartridge container 438 to cartridge 402, thereby enabling execution of the software hierarchy by the cartridge 402. Cartridge 402 may execute RTE 228 followed by execution of SSUS 230, SUI 232, CS 234, and MUSS 236. Execution of RTE 228, SSUS 230, SUI 232, CS 234, and MUSS 236 may result in the exchange of commands and other data that synchronizes operation of each of RTE 128, 228, SSUS 130, 230, SUI 132, 232, CS 134, 234, and MUSS 136, 236. As such, one or more of RTE 228, SSUS 230, SUI 232, CS 234, and MUSS 236 may receive a user setting, a system setting, or other data by which to synchronize operation of the distributed execution environment across head unit 302 and cartridge 402.

As head unit 302 may include an integrated display (e.g., presence sensitive display 112 while cartridge 402 may not include any form of integrated display (e.g., to reduce costs associated with cartridge 402), RTE 22.8 may interface with RTE 128 to present the user interface via the integrated display of the head unit 302. Applications executed by MUSS 236 may pass function calls and kernel level function calls related to graphical user interfaces or other types of interfaces to RTE 228, which may interface with RTE 128 to jointly process the commands.

RTE 228 may translate or otherwise process the function calls to conform to the API for communicating with RTE 128. That is, RTE 228 may conform to a different version of the RTE than RTE 128, and the function calls may conform to the version of the RTE to which RTE 228 conforms. As such, RTE 228 may translate the function calls to conform to the version of the RTE to which RTE 128 conforms to maintain backward compatibility with the version of the RTE to which RTE 128 conforms. In this respect, RTE 228 may represent a shim or other software construct by which to provide backward compatibility between different versions of software (such as runtime environments).

Figure 3:
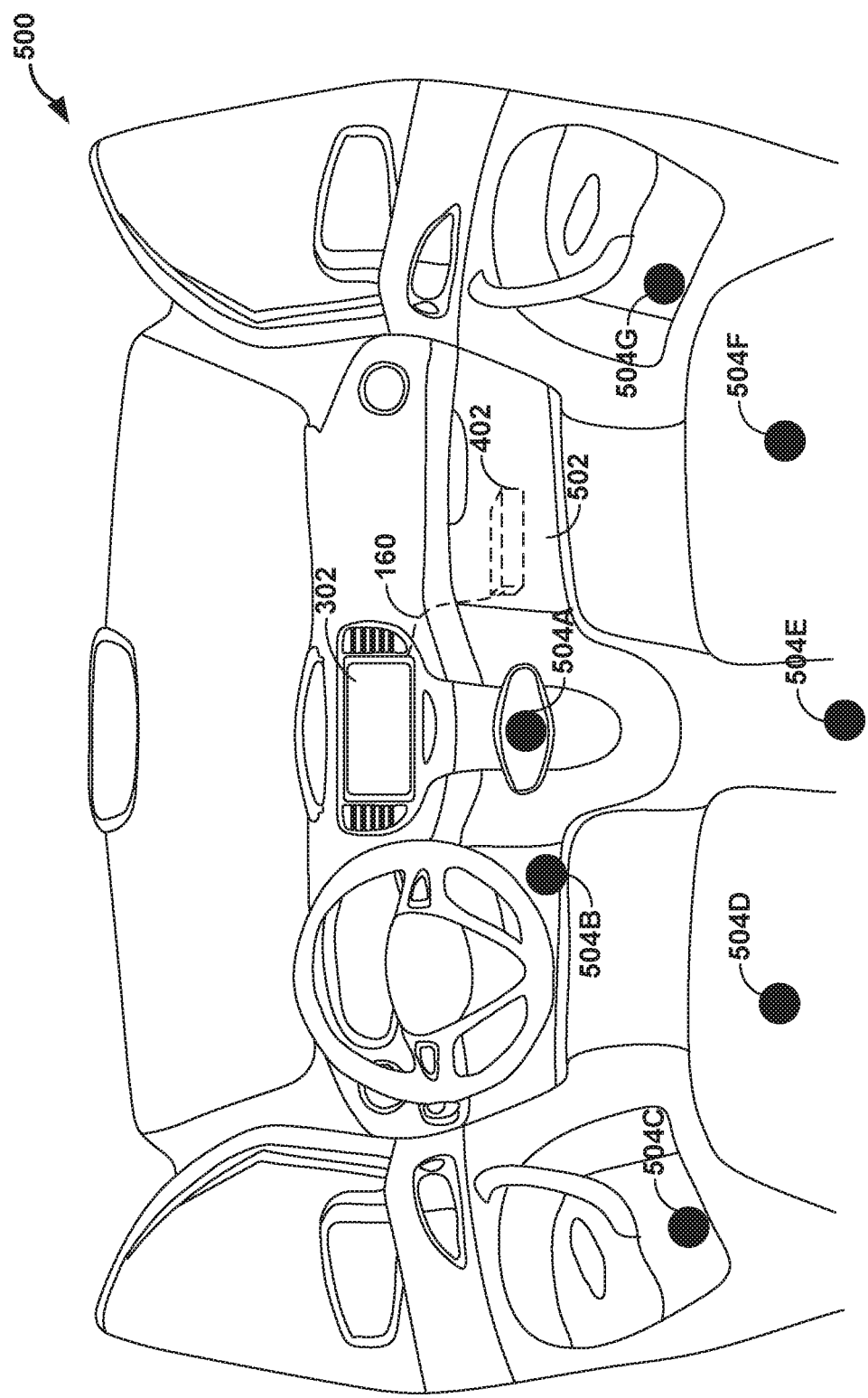
FIG. 3 is a diagram illustrating an example of a vehicle that includes a computing system configured to operate in accordance with various aspects of the extensible computing architecture techniques described in this disclosure.

FIG. 3 is a diagram illustrating an example of a vehicle that includes a computing system configured to operate in accordance with various aspects of the extensible computing architecture techniques described in this disclosure. As shown in the example of FIG. 3, an interior of vehicle 500 may include a computing system in which head unit 302 is communicatively coupled (e.g., via a USB connection 160) to cartridge 402, which may reside in a glovebox 502 of vehicle 500. Cartridge 402 and USB connection 160 is shown in dashed lines to indicate that cartridge 402 and USB connection 160 are installed behind the dashboard (for USB connection 160) and glovebox cover (for cartridge 402) and therefore not visible when viewed by an operator of vehicle 500. Although not shown, cartridge 402 may include another USB port (or other interface port) by which to interface with yet another computing device, such as a smartphone, laptop computer, desktop computer, workstation, gaming system, etc.

Although shown as being installed in glovebox 502, cartridge 402 may be installed anywhere in vehicle 500 where power is available to be provided to cartridge 402. As such, cartridge 402 may be installed in a center dash console location 504A, mounted below driver dash location 504B, a driver door location 504C, an under driver seat location 504D, a center arm rest console location 504E, an under passenger seat location 504F, and/or a passenger door location 504G, as well as any other location at which power is available (but not shown in the example of FIG. 3) such as a rear trunk, a forward trunk, under a rear passenger seat, a rear passenger door, etc.

Figure 4:
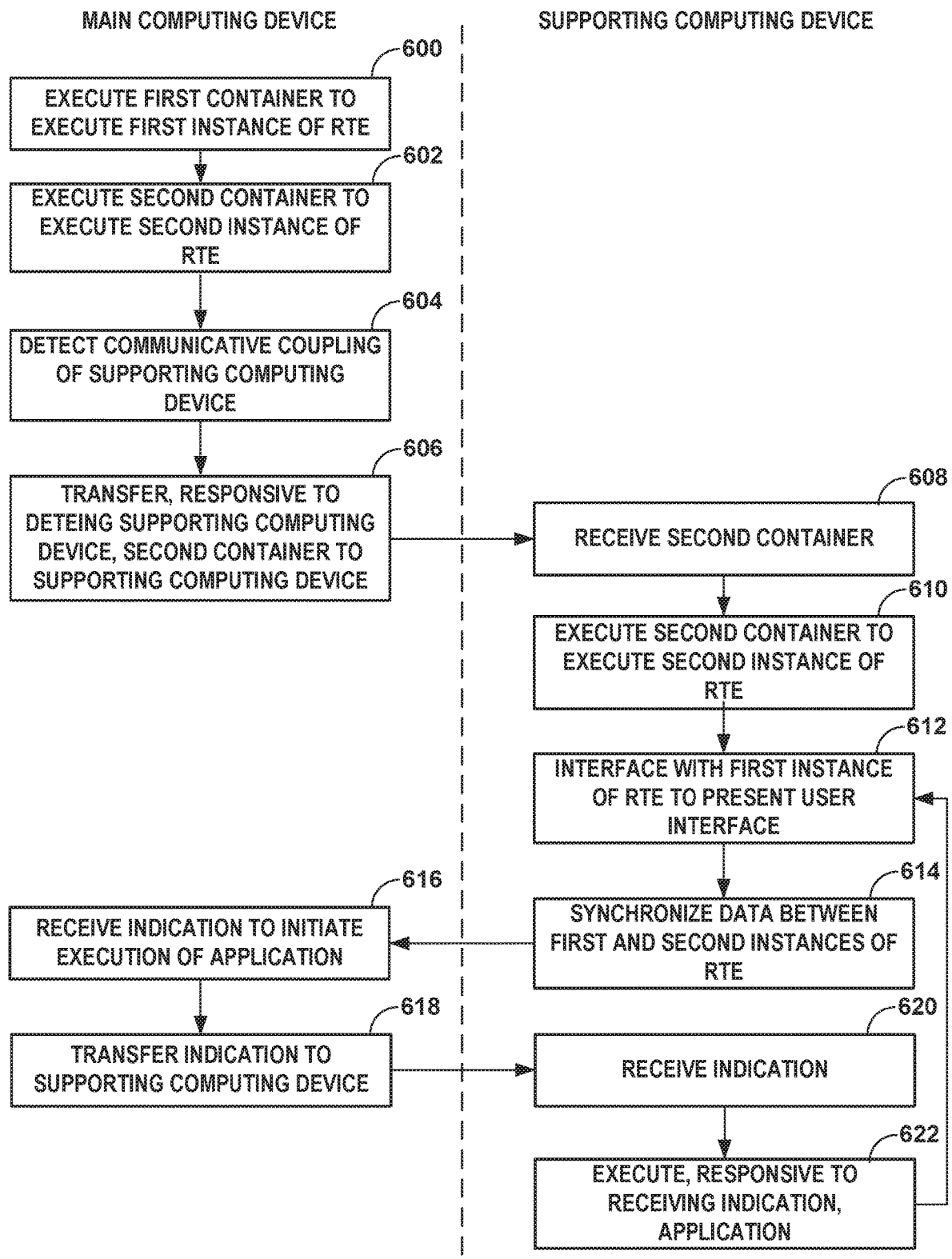
FIG. 4 is a flowchart illustrating example operation of a computing system in performing various aspects of the extensible computing architecture techniques described in this disclosure.

FIG. 4 is a flowchart illustrating example: operation of a computing system in performing various aspects of the extensible computing architecture techniques described in this disclosure. As described in more detail above, main computing device 102 may initially execute both first container 138 and second container 238 in order to execute the first instance of RTE 128 and the second instance of RTE 228 (600, 602). In order to execute RTEs 128 and 228, main computing device 102 may execute a distributed HAL, such as HAL 326 (as shown in the example of FIG. 3). The distributed HAL may enable RTEs 128, 228 to interface with underlying vehicle hardware components, providing an interface, such as an API, with which RTEs 128 and 228 may interface to provide commands and receive data from the underlying vehicle hardware components (e.g., any of the systems described above in more detail).

RTE 128 and/or 228 may detect communicative coupling of supporting computing device 202 (604). RTE 128 may transfer, responsive to detecting the communicative coupling of supporting computing device 202 (or, in other words, responsive to detecting supporting computing device 202), second container 238 to supporting computing device 202 (606). Supporting computing device 202 may receive second container 238 (608), and execute second container 238. That is, supporting computing device 202 may execute a lightweight or minimal operating system by which to initially connect to main computing device 102 (such as a boot loader or other low-level operating system that may provide minimal functionality in order to interface with main computing device 102 but that does not facilitate user or operator interaction or otherwise present a user interface—except potentially a low level user interface, such as a command line interface for purposes of debugging, data gathering, troubleshooting, etc.).

In any event, supporting computing device 202 may receive second container 238, whereupon the low-level operating system may mount second container 238 and execute second container 238 to thereby execute RTE 228 (610). In executing RTE 228, RTE 128 and RTE 228 may synchronize user settings, system settings, and other data or information to thereby jointly present a user interface with which the operator of the vehicle may interact (612, 614). RTE 128 may receive an indication to initiate execution of an application (e.g., via presence-sensitive display 112) and transfer the indication to supporting computing device 202 (616, 618). Supporting computing device 202 may receive the indication 520 (620), where RIF 228 may initiate execution, responsive to receiving the indication, the indicated application (622). RTE 128 and RTE 228 may continue in this manner to present the user interface, synchronize user settings, system settings, or other state data between RTEs 128 and 228, and execute application responsive to indications (612-622).

In this way, various aspects of the techniques described in this disclosure may enable the following clauses.

Clause 1A. A method comprising: executing, by a main computing device integrated into a vehicle, a first container that enables execution of a first instance of a runtime environment; executing, by the main computing device, a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; transfer, responsive to detecting the supporting computing device, the second container to the supporting computing device; and interface with the second instance of the runtime environment executed by the supporting computing device to jointly present the user interface by which the operator of the vehicle controls the functionality of the vehicle.

Clause 2A. The method of clause 1A, wherein the first instance of the runtime environment synchronizes a user setting between the second instance of the runtime environment and the first instance of the runtime environment.

Clause 3A. The method of any combination of clauses 1A and 2A, wherein the first instance of the runtime environment initiates execution of an application by the second instance of the runtime environment.

Clause 4A. The method of any combination of clauses 1A-3A, wherein the first instance of the runtime environment comprises a first partition of the runtime environment, wherein the second instance of the runtime environment comprises a second partition of the runtime environment, wherein the first partition of the runtime environment is configured to redirect execution of an application to the second partition of the runtime environment, and wherein the second partition of the runtime environment is configured to maintain a user space in which the application executes.

Clause 5A. The method of any combination of clauses 1A-4A, wherein the first instance of the runtime environment is configured to synchronize a system setting between the first instance of the runtime environment and the second instance of the runtime environment.

Clause 6A. The method of any combination of clauses 1A-5A, further comprising executing, by the main computing device, a first instance of a distributed hardware abstraction layer that enables the first instance of the runtime environment and the second instance of the runtime environment to interface with hardware components of the vehicle.

Clause 7A. The method of clause 6A, further comprising transferring, responsive to detecting the supporting computing device, a second instance of the distributed hardware abstraction layer to the supporting computing device to enable the supporting computing device to execute the second instance of the hardware abstraction layer that enables the supporting computing device to interface with the hardware components of the vehicle.

Clause 8A. The method of any combination of clauses 1A-7A, wherein the main computing device is communicatively coupled to the supporting computing device.

Clause 9A. The method of clause 8A, wherein the main computing device is wirelessly coupled to the supporting computing device.

Clause 10A. The method of clause 8A, wherein the main computing device is coupled via a wire to the supporting computing device.

Clause 11A. The method of clause 10A, wherein the main computing device is coupled via the wire according to universal system bus (USB) standard to the supporting computing device.

Clause 12A. The method of any combination of clauses 1A-11A, wherein the main computing device comprises a head unit that includes an integrated display by which to present the user interface to the operator of the vehicle.

Clause 13A. The method of any combination of clauses 1A-12A, wherein the supporting computing device comprises a cartridge that does not include an integrated display by which to present the user interface to the operator of the vehicle.

Clause 14A. The method of any combination of clauses 1A-13A, wherein the first instance of the runtime environment includes a first instance of the runtime environment having a first version, wherein the second instance of the runtime environment includes a second instance of the runtime environment having a second version, and wherein the first version is different from the second version.

Clause 15A. A main computing device integrated into a vehicle, the main computing device comprising: a memory configured to store a first instance of a runtime environment and a second instance of the runtime environment; one or more processors configured to: execute a first container that enables execution of a first instance of the runtime environment; execute a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; transfer, responsive to detecting the supporting computing device, the second container to the supporting computing device; and interface with the second instance of the runtime environment executed by the supporting computing device to jointly present the user interface by which the operator of the vehicle controls the functionality of the vehicle.

Clause 16A. The main computing device of clause 15A, wherein the first instance of the runtime environment synchronizes a user setting between the second instance of the runtime environment and the first instance of the runtime environment.

Clause 17A. The main computing device of any combination of clauses 15A and 16A, wherein the first instance of the runtime environment initiates execution of an application by the second instance of the runtime environment.

Clause 18A. The main computing device of any combination of clauses 15A-17A, wherein the first instance of the runtime environment comprises a first partition of the runtime environment, wherein the second instance of the runtime environment comprises a second partition of the runtime environment, wherein the first partition of the runtime environment is configured to redirect execution of an application to the second partition of the runtime environment, and wherein the second partition of the runtime environment is configured to maintain a user space in which the application executes.

Clause 19A. The main computing device of any combination of clauses 15A-18A, wherein the first instance of the runtime environment is configured to synchronize a system setting between the first instance of the runtime environment and the second instance of the runtime environment.

Clause 20A. The main computing device of any combination of clauses 15A-19A, wherein the one or more processors are further configured to execute a first instance of a distributed hardware abstraction layer that enables the first instance of the runtime environment and the second instance of the runtime environment to interface with hardware components of the vehicle.

Clause 21A. The main computing device of clause 20A, wherein the one or more processors are further configured to transfer, responsive to detecting the supporting computing device, a second instance of the distributed hardware abstraction layer to the supporting computing device to enable the supporting computing device to execute the second instance of the hardware abstraction layer that enables the supporting computing device to interface with the hardware components of the vehicle.

Clause 22A. The main computing device of any combination of clauses 15A-21A, wherein the main computing device is communicatively coupled to the supporting computing device.

Clause 23A. The main computing device of clause 22A, wherein the main computing device is wirelessly coupled to the supporting computing device.

Clause 24A. The main computing device of clause 22A, wherein the main computing device is coupled via a wire to the supporting computing device.

Clause 25A. The main computing device of clause 24A, wherein the main computing device is coupled via the wire according to universal system bus (USW) standard to the supporting computing device.

Clause 26A. The main computing device of any combination of clauses 15A-25A, wherein the main computing device comprises a head unit that includes an integrated display by which to present the user interface to the operator of the vehicle.

Clause 27A. The main computing device of any combination of clauses 15A-26A, wherein the supporting computing device comprises a cartridge that does not include an integrated display by which to present the user interface to the operator of the vehicle.

Clause 28A. The main computing device of any combination of clauses 15A-27A, wherein the first instance of the runtime environment includes a first instance of the runtime environment having a first version, wherein the second instance of the runtime environment includes a second instance of the runtime environment having a second version, and wherein the first version is different from the second version.

Clause 29A. A non-transitory computer-readable storage medium having stored thereon instructions that, when executed, cause one or more processors of a main computing device to: execute a first container that enables execution of a first instance of a runtime environment; execute a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; transfer, responsive to detecting the supporting computing device, the second container to the supporting computing device; and interface with the second instance of the runtime environment executed by the supporting computing device to jointly present the user interface by which the operator of the vehicle controls the functionality of the vehicle.

Clause 1B. A method comprising: receiving, from a main computing device integrated into a vehicle that supports execution of a first container in which a first instance of a runtime environment executes, and by a supporting computing device, a second container that supports execution of a second instance of the runtime environment, the first instance of the runtime environment and the second instance of the runtime environment configured to jointly present a user interface by which an operator of the vehicle controls functionality of the vehicle, and executing, by the supporting computing device, the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle.

Clause 2B. The method of clause 1B, further comprising receiving a user setting from the first instance of the runtime environment to synchronize the user setting between the first instance of the runtime environment and the second instance of the runtime environment.

Clause 3B. The method of any combination of clauses 1B and 2B, further comprising receiving an indication from the first instance of the runtime environment that initiates execution of an application by the second instance of the runtime environment.

Clause 4B. The method of any combination of clauses 1B-3B, wherein the first instance of the runtime environment comprises a first partition of the runtime environment, wherein the second instance of the runtime environment comprises a second partition of the runtime environment, and wherein the second partition of the runtime environment is configured to, responsive to an indication to initiate execution of an application from the first partition of the runtime environment, maintain a user space in which the application executes.

Clause 5B. The method of any combination of clauses 1B-4B, further comprising receiving a system setting that synchronizes the system setting between the first instance of the runtime environment and the second instance of the runtime environment.

Clause 6B. The method of any combination of clauses 1B-5B, further comprising executing, by the supporting computing device, a second instance of a distributed hardware abstraction layer that enables the first instance of the runtime environment and the second instance of the runtime environment to interface with hardware components of the vehicle.

Clause 7B. The method of clause 6B, further comprising: receiving, responsive to detecting the main computing device, the second instance of the distributed hardware abstraction layer; and executing the second instance of the hardware abstraction layer to communicate with a first instance of the hardware abstraction layer and enable the supporting computing device to interface with the hardware components of the vehicle.

Clause 8B. The method of any combination of clauses 1B-7B, wherein the main computing device is communicatively coupled to the supporting computing device.

Clause 9B. The method of clause 8B, wherein the main computing device is wirelessly coupled to the supporting computing device.

Clause 10B. The method of clause 8B, wherein the main computing device is coupled via a wire to the supporting computing device.

Clause 11B. The method of clause 10B, wherein the main computing device is coupled via physical universal system bus (USB) connection to the supporting computing device.

Clause 12B. The method of any combination of clauses 1B-11B, wherein the main computing device comprises a head unit that includes an integrated display by which to present the user interface to the operator of the vehicle.

Clause 13B. The method of any combination of clauses 1B-12B, wherein the supporting computing device comprises a cartridge that does not include an integrated display by which to present the user interface to the operator of the vehicle.

Clause 14B. The method of any combination of clauses 1B-13B, wherein the first instance of the runtime environment includes a first instance of the runtime environment having a first version wherein the second instance of the runtime environment includes a second instance of the runtime environment having a second version, and wherein the first version is different from the second version.

Clause 15B. A supporting computing device comprising: one or more processors configured to: receive, from a main computing device integrated into a vehicle that supports execution of a first container in which a first instance of a runtime environment executes, a second container that supports execution of a second instance of the runtime environment, the first instance of the runtime environment and the second instance of the runtime environment configured to jointly present a user interface by which an operator of the vehicle controls functionality of the vehicle, and execute the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle; and a memory configured to store the second container.

Clause 16B. The supporting computing device of clause 15B, wherein the one or more processors are further configured to receive a user setting from the first instance of the runtime environment to synchronize the user setting between the first instance of the runtime environment and the second instance of the runtime environment.

Clause 17B. The supporting computing device of any combination of clauses 15B and 16B, wherein the one or more processors are further configured to receive an indication from the first instance of the runtime environment that initiates execution of an application by the second instance of the runtime environment.

Clause 18B. The supporting computing device of any combination of clauses 15B-17B, wherein the first instance of the runtime environment comprises a first partition of the runtime environment, wherein the second instance of the runtime environment comprises a second partition of the runtime environment, and wherein the second partition of the runtime environment is configured to, responsive to an indication to initiate execution of an application from the first partition of the runtime environment, maintain a user space in which the application executes.

Clause 19B. The supporting computing device of any combination of clauses 15B-18B, wherein the one or more processors are further configured to receive a system setting that synchronizes the system setting between the first instance of the runtime environment and the second instance of the runtime environment.

Clause 20B. The supporting computing device of any combination of clauses 15B-19B, wherein the one or more processors are further configured to execute a second instance of a distributed hardware abstraction layer that enables the first instance of the runtime environment and the second instance of the runtime environment to interface with hardware components of the vehicle.

Clause 21B. The supporting computing device of clause 20B, wherein the one or more processors are further configured to: receive, responsive to detecting the main computing device, the second instance of the distributed hardware abstraction layer; execute the second instance of the hardware abstraction layer to communicate with a first instance of the hardware abstraction layer and enable the supporting computing device to interface with the hardware components of the vehicle.

Clause 22B. The supporting computing device of any combination of clauses 15B-21B, wherein the main computing device is communicatively coupled to the supporting computing device.

Clause 23B. The supporting computing device of clause 22B, wherein the main computing device is wirelessly coupled to the supporting computing device.

Clause 24B. The supporting computing device of clause 22B, wherein the main computing device is coupled via a wire to the supporting computing device.

Clause 25B. The supporting computing device of clause 24B, wherein the main computing device is coupled via physical universal system bus (USB) connection to the supporting computing device.

Clause 26B. The supporting computing device of any combination of clauses 15B-25B, wherein the main computing device comprises a head unit that includes an integrated display by which to present the user interface to the operator of the vehicle.

Clause 27B. The supporting computing device of any combination of clauses 15B-26B, wherein the supporting computing device comprises a cartridge that does not include an integrated display by which to present the user interface to the operator of the vehicle.

Clause 28B. The supporting computing device of any combination of clauses 15B-27B, wherein the first instance of the runtime environment includes a first instance of the runtime environment having a first version, wherein the second instance of the runtime environment includes a second instance of the runtime environment having a second version, and wherein the first version is different from the second version.

Clause 29B. A non-transitory computer-readable storage medium having stored thereon instructions that, when executed, cause one or more processors of a supporting computing device to: receive, from a main computing device integrated into a vehicle that supports execution of a first container in which a first instance of a runtime environment executes, a second container that supports execution of a second instance of the runtime environment, the first instance of the runtime environment and the second instance of the runtime environment configured to jointly present a user interface by which an operator of the vehicle controls functionality of the vehicle, and execute the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle; and a memory configured to store the second container.

Clause 1C. A computing system comprising: a main computing device configured to: execute a first container that enables execution of a first instance of a runtime environment; execute a second container that enables execution of a second instance of the runtime environment, the first instance of the runtime environment and the second instance of the runtime environment configured to jointly present a user interface by which an operator of the vehicle controls functionality of the vehicle; wherein the first instance of the runtime environment is configured to: detect a supporting computing device in communication with the main computing device; and transfer, responsive to detecting the supporting computing device, the second container to the supporting computing device; and a supporting computing device configured to: receive, from the main computing device, the second container that supports execution of the second instance of the runtime environment; and execute the second container to enable execution of the second instance of the runtime environment, wherein the second instance of the runtime environment is configured to interface with the first instance of the runtime environment executed by the main computing device to jointly present the user interface by which the operator of the vehicle controls the functionality of the vehicle.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, ultra Blu-ray, etc. where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
executing, by a main computing device integrated into a vehicle, a first container that includes a first partition of a runtime environment; and
executing, by the main computing device, a second container that includes a second partition of the runtime environment, the first partition of the runtime environment and the second partition of the runtime environment configured to jointly present a user interface by which an operator of the vehicle controls functionality of the vehicle;
wherein the first partition of the runtime environment is configured to:
detect a supporting computing device in communication with the main computing device;
transfer, responsive to detecting the supporting computing device, the second container to the supporting computing device; and
interface with the second partition of the runtime environment executed by the supporting computing device to jointly present the user interface by which the operator of the vehicle controls the functionality of the vehicle.

2. The method of claim 1, wherein the first partition of the runtime environment synchronizes a user setting between the second partition of the runtime environment and the first partition of the runtime environment.

3. The method of claim 1, wherein the first partition of the runtime environment initiates execution of an application by the second partition of the runtime environment.

4. The method of claim 1,
wherein the first partition of the runtime environment is configured to redirect execution of an application to the second partition of the runtime environment, and
wherein the second partition of the runtime environment is configured to maintain a user space in which the application executes.

5. The method of claim 1, wherein the first partition of the runtime environment is configured to synchronize a system setting between the first partition of the runtime environment and the second partition of the runtime environment.

6. The method of claim 1, further comprising executing, by the main computing device, a first instance of a distributed hardware abstraction layer that enables the first partition of the runtime environment and the second partition of the runtime environment to interface with hardware components of the vehicle.

7. The method of claim 6, further comprising transferring, responsive to detecting the supporting computing device, a second instance of the distributed hardware abstraction layer to the supporting computing device to enable the supporting computing device to execute the second instance of the hardware abstraction layer that enables the supporting computing device to interface with the hardware components of the vehicle.

8. The method of claim 1, wherein the main computing device is communicatively coupled to the supporting computing device.

9. The method of claim 8, wherein the main computing device is wirelessly coupled to the supporting computing device.

10. The method of claim 8, wherein the main computing device is coupled via a wire to the supporting computing device.

11. The method of claim 10, wherein the main computing device is coupled via the wire according to universal system bus (USB) standard to the supporting computing device.

12. The method of claim 1, wherein the main computing device comprises a head unit that includes an integrated display by which to present the user interface to the operator of the vehicle.

13. The method of claim 1, wherein the supporting computing device comprises a cartridge that does not include an integrated display by which to present the user interface to the operator of the vehicle.

14. The method of claim 1,
wherein the first partition of the runtime environment includes a first partition of the runtime environment having a first version,
wherein the second partition of the runtime environment includes a second partition of the runtime environment having a second version, and
wherein the first version is different from the second version.

15. A main computing device integrated into a vehicle, the main computing device comprising:
a memory configured to store a first partition of a runtime environment and a second partition of the runtime environment;
one or more processors configured to:
execute a first container that includes the first partition of the runtime environment; and
execute a second container that includes the second partition of the runtime environment, the first partition of the runtime environment and the second partition of the runtime environment configured to jointly present a user interface by which an operator of the vehicle controls functionality of the vehicle;
wherein the first partition of the runtime environment is configured to:
detect a supporting computing device in communication with the main computing device;
transfer, responsive to detecting the supporting computing device, the second container to the supporting computing device; and
interface with the second partition of the runtime environment executed by the supporting computing device to jointly present the user interface by which the operator of the vehicle controls the functionality of the vehicle.

16. The main computing device of claim 15, wherein the first partition of the runtime environment synchronizes a user setting between the second partition of the runtime environment and the first instance of the runtime environment.

17. The main computing device of claim 15, wherein the first partition of the runtime environment initiates execution of an application by the second partition of the runtime environment.

18. The main computing device of claim 15,
wherein the first partition of the runtime environment is configured to redirect execution of an application to the second partition of the runtime environment, and
wherein the second partition of the runtime environment is configured to maintain a user space in which the application executes.

19. The main computing device of claim 15, wherein the first partition of the runtime environment is configured to synchronize a system setting between the first partition of the runtime environment and the second partition of the runtime environment.

20. A non-transitory computer-readable storage medium having stored thereon instructions that, when executed, cause one or more processors of a main computing device to:
execute a first container that includes a first partition of a runtime environment; and
execute a second container that includes a second partition of the runtime environment, the first partition of the runtime environment and the second partition of the runtime environment configured to jointly present a user interface by which an operator of the vehicle controls functionality of the vehicle;
wherein the first partition of the runtime environment is configured to:
detect a supporting computing device in communication with the main computing device;
transfer, responsive to detecting the supporting computing device, the second container to the supporting computing device; and
interface with the second partition of the runtime environment executed by the supporting computing device to jointly present the user interface by which the operator of the vehicle controls the functionality of the vehicle.

\* \* \* \* \*